(12) United States Patent
Stieler

(10) Patent No.: US 6,584,959 B2
(45) Date of Patent: Jul. 1, 2003

(54) THICK WALLED CONVOLUTED TUBING FOR USE IN FUEL FEED AND RETURN APPLICATIONS

(75) Inventor: David Carl Stieler, Lake Orion, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/864,757

(22) Filed: May 24, 2001

(65) Prior Publication Data

US 2001/0037795 A1 Nov. 8, 2001

Related U.S. Application Data

(63) Continuation-in-part of application No. 09/321,283, filed on May 27, 1999, now abandoned.
(60) Provisional application No. 60/235,427, filed on Sep. 26, 2000.

(51) Int. Cl.[7] .............................................. F02M 55/02
(52) U.S. Cl. ....................................................... 123/468
(58) Field of Search ................................ 123/468, 469; 138/121, 26, 30

(56) References Cited

U.S. PATENT DOCUMENTS

| | | | |
|---|---|---|---|
| 5,284,184 A | 2/1994 | Noone et al. | 138/121 |
| 5,383,087 A | 1/1995 | Noone et al. | 361/215 |
| 5,441,313 A * | 8/1995 | Kalahasthy | 285/93 |
| 5,460,771 A | 10/1995 | Mitchell et al. | 264/508 |
| 5,469,892 A | 11/1995 | Noone et al. | 138/121 |
| 5,520,223 A | 5/1996 | Iorio | 138/140 |
| 5,524,673 A | 6/1996 | Noone et al. | 138/103 |
| 5,542,712 A * | 8/1996 | Klinger et al. | 285/93 |
| 5,566,720 A | 10/1996 | Cheny et al. | 138/137 |
| 5,590,691 A | 1/1997 | Iorio et al. | 138/146 |
| 5,638,871 A | 6/1997 | Iorio et al. | 138/146 |
| 5,678,611 A | 10/1997 | Noone et al. | 138/137 |
| 5,743,304 A | 4/1998 | Mitchell et al. | 138/137 |
| 5,771,940 A | 6/1998 | Iorio et al. | 138/146 |
| 5,823,508 A | 10/1998 | Nie | 251/149.6 |
| 5,829,483 A * | 11/1998 | Tukahara et al. | 138/109 |
| 5,865,218 A | 2/1999 | Noone et al. | 138/137 |
| 5,867,883 A | 2/1999 | Iorio et al. | 29/460 |
| 5,875,820 A * | 3/1999 | Braun | 138/109 |
| 5,884,671 A | 3/1999 | Noone et al. | 138/137 |
| 5,884,672 A | 3/1999 | Noone et al. | 138/137 |
| 5,996,642 A | 12/1999 | Noone et al. | 138/137 |
| 6,003,562 A | 12/1999 | Iorio et al. | 138/138 |
| 6,155,302 A * | 12/2000 | Fischerkeller et al. | 138/109 |
| 6,170,534 B1 | 1/2001 | Noone et al. | 138/137 |
| 6,180,197 B1 | 1/2001 | Nie et al. | 428/36.91 |
| 6,245,183 B1 | 6/2001 | Iorio et al. | 156/244.14 |

\* cited by examiner

*Primary Examiner*—Mahmoud Gimie
(74) *Attorney, Agent, or Firm*—Young & Basile, P.C.

(57) ABSTRACT

A convoluted tubing assembly for use in essentially fluid-tight connection with a suitable connector body which includes a multi-layer or single layer tubing having an elongated cylindrical wall having an outer surface and inner surface parallel to the outer surface. The inner surface defines an essentially unobstructed circular interior opening extending longitudinally through the tube. The tubing includes a first region in which the cylindrical wall is essentially parallel to the longitudinal axis running coaxially through the cylindrical interior. The tubing includes another region continuous to the first region, wherein the other region includes at least one corrugation in the cylindrical wall. The corrugated region has a cross sectional diameter which varies depending on position with respect to the corrugations longitudinal length and has a diameter different from the essentially uniform cross section diameter of the first region.

25 Claims, 4 Drawing Sheets

THICK WALLED CONVOLUTED TUBING FOR USE IN FUEL FEED AND RETURN APPLICATIONS

RELATED APPLICATIONS

The present application claims priority to provisional patent application Ser. No. 60/235,427 filed Sep. 26, 2000 which is a continuation-in-part of U.S. Ser. No. 09/321,283 (ITT-383-A) filed on May 27, 1999, which is abandoned.

BACKGROUND OF THE INVENTION

1. Field of the Invention

The present invention relates to corrugated tubing. More particularly, the present invention relates to multi-layer tubing having at least one region of corrugation. Even more particularly, the present invention relates to multi-layered corrugated tubing having enhanced wall thicknesses which can accommodate direct interface with various connectors. Finally, the present invention relates to thick-walled corrugated or convoluted tubing in connection with connectors literally projecting therefrom.

2. Brief Discussion of Relevant Art

Quick connect couplings have been widely used in the U.S. Automobile industry for many years. Although applicable in numerous applications, quick connectors are typically employed in fuel system and vapor recovery systems. The simplest and most cost effective design is the plastic housing female type quick connector releasably mated to a metal male tube end form. The opposite end of the female housing most typically defines a stem having a member of axially spaced barbs formed on the outer circumferential surface thereof and a nylon or plastic tubing end form pressed there over. Such an arrangement is described in U.S. Pat. No. 5,542,712, issued Aug. 6, 1996, entitled "Quick Connector Housing With Elongated Barb Design."

In fluid handling systems, it is imperative that the connectors used have their male and female portions properly coupled together. Faulty connection enables an associated system to leak fluid. This can be particularly disadvantageous when the system is under pressure and the leaking connector/tubing interface expels the pressurized fluid.

Furthermore, recent federal legislation has mandated significantly reduced hydrocarbon emissions from automotive fuel and vapor recovery systems. Conventional quick connectors, although effective to mechanically maintain tubing end forms in assembly with their associated connector bodies, have not adequately addressed the federal requirements. Also, the materials employed, typically nylon 12, do not provide sufficient resistance to the permeation of hydrocarbons there though.

The permeation problem has been addressed, in part, through the development of co-extruded multi-layered plastic tube constructions containing two or more discreet layers of different types or formulations of plastic, one of which is specifically designed to provide an effective permeation resistance layer, blocking the escape of hydrocarbons from the system. In general, the most successful multi-layered tubing employs an outer layer composed of a material resistant to the exterior environment. The innermost layer is thinner and is composed of a material which is chosen for its ability to block defusion of materials, such as hydrocarbons, alcohols and other materials present in fuel blends, to the outer layer. The innermost layer may have a degree of electrical conductivity sufficient to dissipate static charges generated by the flow of fluid therein. To date, it has been extremely difficult to obtain satisfactory lamination characteristics between dissimilar polymer layers. Thus, the use of one or more intermediate layers for bonding the inner and outer layers has been proposed.

In various vehicular applications, durability concerns necessitate the use of fiberglass or stainless steel braiding as reinforcement while such configurations provide strong and durable hose configurations, braid reinforced polymeric hose configurations are difficult to adequately seal to the associated connector. Braid reinforced hoses have the additional drawback of kinking when bent or twisted to accomplish installation in the associated vehicle.

A related problem stems from dual aspects of commercially available quick connect devices, to wit: high volume and low sale price frequently necessitating the use of inexpensive, somewhat pliable materials, and complex contours of extremely small inter-fitting components. These aspects collectively increase the likelihood of misassembly. High volume production techniques, including automated assembly tends to aggravate the problem wherein misassembly or impermissible dimensional variations of the components are difficult to detect. Excessive dimensional tolerance stack-up can result in low pull-apart characteristics between the barbed stem of an associated connector and the plastic tube a producing leakage. Misassembly, such as failure to include an O-ring can also result in leakage. In the case of multi-layered tubes, dimensional and/or adhesive problems can result in mechanical delamination upon insertion of the tube over the barbed stem. Finally, mono-wall plastic tube or multi-layered structures with low hoop strength can relax over time or at elevated temperatures, resulting in leaking or weeping of fluid.

In related application Ser. No. 08/874,755, the specification of which is incorporated by reference in its entirety herein, a simple, inexpensive mechanically and environmentally robust connection between a tube end form and a connector body was proposed which eliminated the use of O-rings, wedding bands and the like by achieving a spin-welding connection. Braid reinforced tubing constructions are difficult to connect by spin-welding processes due at least, in part, to irregularities at the tube end form caused by the braid reinforcement.

Thus, it is highly desirable to provide a flexible tube or hose configuration, which is resistant to kinking and provides the reinforcement and strength of braid reinforced tubing. It is also desirable to provide a flexible hose configuration which possesses greater hoop strength then braid reinforced hose material or various thin-wall tubing configurations.

SUMMARY OF THE INVENTION

It is an object of the present invention to provide thick-walled convoluted tubing which can be successfully employed in fuel systems to provide a simple and inexpensive, yet mechanically and environmentally robust connection between the tube and a suitable connector body. It is also an object to provide a strong and inexpensive tube which is either convoluted or straight-walled and exhibits good hoop strength at the end form.

The present invention is an improved tube configuration for use in essentially fluid-tight connection with a suitable connector body which includes a multi-layer or single layer tubing having an elongated cylindrical wall having an outer surface and inner surface parallel to the outer surface. The inner surface defines an essentially unobstructed circular interior opening extending longitudinally through the tube.

The tubing includes a first region in which the cylindrical wall is essentially parallel to the longitudinal axis running coaxially through the cylindrical interior. The tubing includes another region continuous to the first region, wherein the other region includes at least one corrugation in the cylindrical wall. The corrugated region has a cross sectional diameter which varies depending on position with respect to the corrugations longitudinal length and has a diameter different from the essentially uniform cross section diameter of the first region.

Other objects, advantages and applications of the present invention will become apparent to those skilled in the art when the following description of the invention is read in conjunction with the accompanying drawings.

DESCRIPTION OF THE DRAWING

The objects, features and advantages of the present invention will become more readily apparent from the following description, reference is made to the following drawing figures in which like reference numerals are employed to refer to like elements throughout the various figures, and in which.

DESCRIPTION OF THE PREFERRED EMBODIMENT

Figure 1:
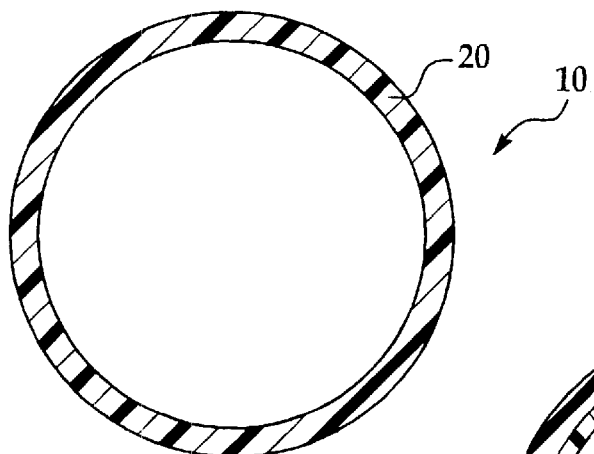
FIG. 1 is a sectional view through a piece of a thick-wall, convoluted tubing of the present invention having a single layer of material.

The present invention is predicated on the unexpected discovery that thick-walled, convoluted tubing can be permanently and successfully joined to a suitable connector body in manner which eliminates leakage and permeation in high pressure applications such as fuel circulation. Such material unexpectedly demonstrated marked increases in the lamination durability between layers in multi-layer configurations and exhibited unexpected hoop strength at the joint-connector interface in both monowall and multi-layer constructions.

The thick-walled, convoluted tubing may be either monowall or multi-layered, depending upon the material of construction employed. The tubing 10 is preferably multi-layer and is configured as disclosed in U.S. Pat. Nos. 5,284,184 and 5,469,892 incorporated herein by reference. The multi-layer tubing as used in the subject invention may further include the material configurations as disclosed in U.S. Pat. Nos. 5,524,673 and 5,566,720 also incorporated herein by reference.

The tubing 10 of the present invention is preferably defined by at least one corrugated region 12 located in its length to accommodate bending, flexing or twisting and further to damp the resonance frequency associated with fuel systems of internal combustion engines. The tubing 10 may also include a region 14 having an essentially uniform cross-section. The tubing 10 of the present invention typically may have an outer diameter up to 50 mm. In application such as fuel lines and also in fluid recovery systems, outer diameters of up to 50.8 mm (2 inches) may be utilized. Outer diameters between 8 to 15 mm are typically preferred in fuel lines, large diameters are typically employed in constructions such as fuel filler tubes and the like. It is also within the purview of the present invention that the tubing be essentially non-corrugated, ie essentially straight walled material depending on the location in which the tubing is to be positioned in the automotive vehicle.

The thick-walled, convoluted tubing 10 will have wall thicknesses between 0.5 mm and 2.5 mm are generally employed with wall thicknesses of approximately 1.5 to 2.5 mm being preferred for high pressure fuel lines. In the most preferred embodiment, a wall thickness between about 2.0 to 2.5 mm is employed. While it is within the scope of this invention to use a corrugated tubing 10 having one or any number of overlaying thermoplastic materials, the tubing 10 of the present invention generally has a maximum of five layers inclusive of the bonding layers. Non-convoluted portions of the tubing may also have wall thickness in the dimensions enumerated. The wall thickness of the tubing is essentially uniform along its longitudinal length.

The tubing of the present invention is made of a material which is suitable for use in motor vehicles and comprises a relatively thick outer layer which is non-reactive with the external environment and can withstand various shocks, vibrational fatigue and changes in temperature as well as exposure to various corrosive or degrative compounds to which it would be exposed through the normal course of operation of the motor vehicle. The tubing material will be discussed further hereinafter.

The single or multi-layer convoluted tube 10 of the present invention is composed of an elongated cylindrical wall 18 which preferably has an essentially circular cross-section perpendicular to its longitudinal axis. The cylindrical wall 18 has an essentially uniform wall thickness throughout its length in circumference and is defined by an inner surface and an opposed outer surface. The inner surface defines an essentially cylindrical opening which extends longitudinally through the tubing 10 of the present invention essentially coaxial to the longitudinal axis.

In the preferred embodiment, the cylindrical wall 18 of the multi-layer or singular tube comprises at least two distinct regions. The cylindrical wall has a first region 14 where the cylindrical wall 18 is essentially parallel to the longitudinal axis. Contiguous to the first region 14 is a second region 12 which is defined by at least one convolution 12 or corrugation in the cylindrical wall 18. As used herein, the term convolution is defined as a area of cylindrical wall which deviates from parallel the longitudinal axis. This deviation can produce inner diameter which is between about 20% and 300% greater than the inner diameter of the first region at its maximum. In the preferred embodiment, the inner diameter of convolution is between 20% and 100% greater than the inner diameter of the first region 14.

The tubing configuration of the present invention can have as many convolutions with any length of cylindrical tubing optionally interposed there between as would be necessary to accommodate varying engine requirements and packaging requirement. The geometry of the convolutions can be of any cross-sectional profile desired. Thus the convolutions may have angled, squared or sinusoidal profiles as desired.

The thick walled convoluted tube 10 of the present invention may be installed as a portion of the fuel delivery or return system by any suitable connection means such as disclosed in U.S. Pat. No. 5,090,745 which is incorporated herein by reference. The connection means may include an optional compression sleeve 16 made of plastic material which does not relax at high temperatures such as 350° F. so that a compressive pressure is maintained on the end of the thick walled convoluted tubing at elevated temperatures. Other conventional connection means that provide operative coupling to the fuel line may also be employed and will be discussed subsequently. As indicated previously, it has been found unexpectedly that the tubing of the present invention also exhibits increased hoop strength such that in particular vehicular applications, the tubing may be coupled to a suitable connector without requiring O-rings, wedding bands, compression sleeves and the like.

The corrugated tubing may have a mono-wall tubing or a multi-layer tubing construction. Multi-layer tubing provides added advantages when carrying fuel as would occur when the tubing connection construction are employed in a fuel injection system. A typical mono-walled corrugated tubing 10, as shown in FIG. 1, would have a single layer 20 constructed from a suitable thermoplastic material. Preferably, such materials will provide a cold impact resistance of at least 2 foot pounds at −20° C. Suitable thermoplastic materials are preferably selected from the group consisting of thermoplastic elastomers, polyamides and mixtures thereof. Suitable polyamides are selected from the group consisting of Nylon 11, Nylon 12, Nylon 6 and mixtures thereof, with Nylon 12 being most preferred.

The corrugated tube 10 will preferably have a tensile strength of no less than 15 N/mm² and an elongation value of at least 150% at 23° C. The tube 10 of this embodiment has a burst strength at 23° C. and 120° C. of at least 20 bar and is sufficiently resistant to exposure to break fluid, engine oil and peroxides such as those which may be found in gasoline. The tube 10 is suitable for use at an outer service temperature range of about −40° C. and about 150° C., with a range of −20° C. to 150° C. being preferred.

Figure 2:
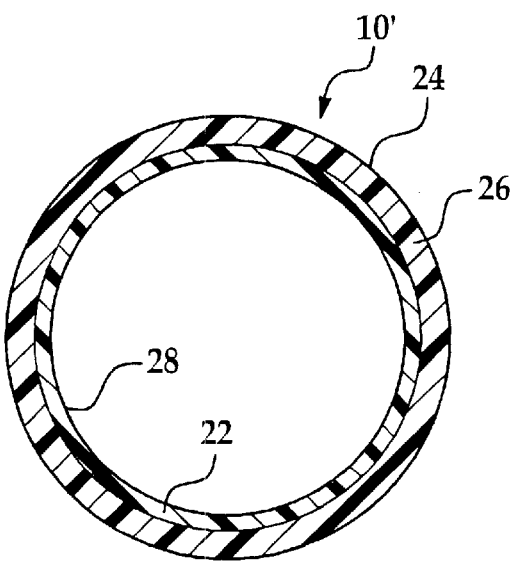
FIG. 2 is a sectional view through a piece of thick-wall, convoluted tubing having two layers of material.

The tube 10 may have two layers as depicted in the second embodiment in FIG. 2. The outer layer 24 is preferably composed of the at least one of the thermoplastic materials selected from the group consisting of thermoplastic elastomers, polyamides, and mixtures thereof. The resulting two layer tube 10 will have the operating parameters and specifications enumerated previously; namely a tensile strength of no less than 15 N/mm² and an elongation value of at least 150% at 230° C. The tube 10 of this embodiment has a burst strength at 23° C. and 120° C. of at least 20 bar and is sufficiently resistant to exposure to break fluid, engine oil and peroxides such as those found in gasoline. The tube 10 as depicted in FIG. 2 is suitable for use at an outer service temperature range of about −40 ° C. and about 150° C. with a range of −20° C. to 150° C. being preferred.

In the second embodiment shown in FIG. 2, a layer 22 is positioned radially innermost of the outer layer 20. The inner layer 22 has an inner surface 28 oriented to come into direct contact with the fuel or gaseous material conveyed through the tube 10. The inner layer 22 is composed of a suitable melt-processible thermoplastic material which exhibits resistance to the components contained in conventional gasoline fuel mixtures including, but not limited to, alcohols such as methanol and ethanol, peroxides, short-chain hydrocarbons and the like. The thermoplastic material may be a suitable melt-processible material selected from the group consisting of fluoroplastics, thermoplastic polyesters, and mixtures thereof.

In the preferred two-layer embodiment, the fluoroplastic polymer of choice employed in the present invention has a melt temperature between about 160° and 200° C.; with a melt temperature between about 165° and 180° C. being most preferred. The specific gravity of material employed in the inner layer 22 is, between 1.95 and 1.98. The preferred fluoropolymer is a multi-component system having as its three major components an alkylene fluoropolymer, a material made from a fluoro-olefin monomer or monomers and a vinyl fluoride material. Such materials are reacted by a suitable process to form a terpolymeric material. Various terpolymeric materials are commercially available for use in co-extrusion processes to form the tube 10 of the present invention. Selection of such material suitable for the use would be within the purview of the skilled artisan after reading this disclosure.

Figure 3:
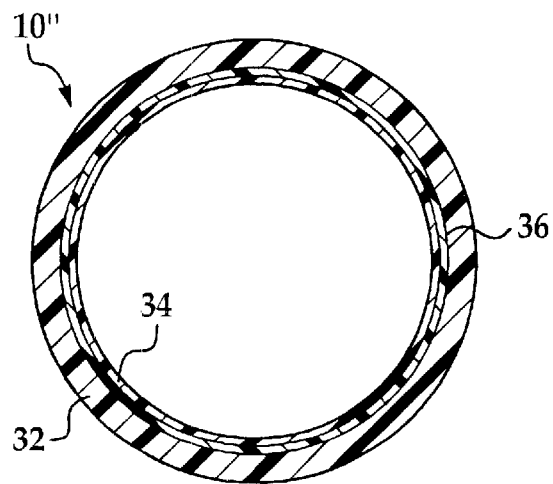
FIG. 3 is a sectional view through a piece of thick-wall, convoluted tubing having three layers of material.
Figure 4:
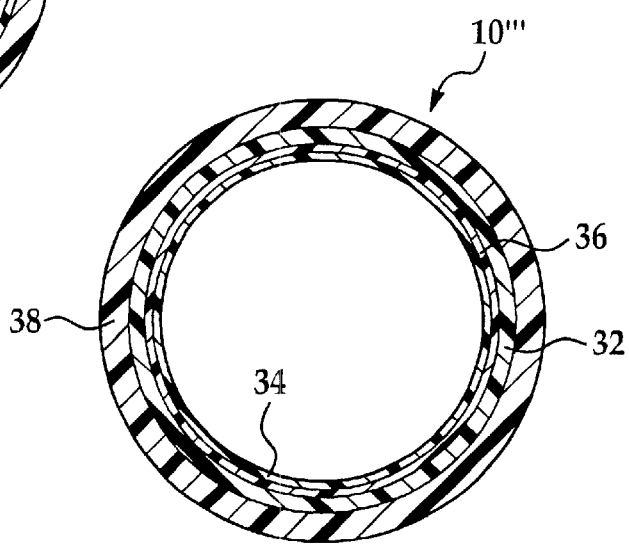
FIG. 4 is a sectional view through a piece of thick-wall, convoluted tubing having four layers of material.

In the third, fourth and fifth embodiments of the present invention (FIGS. 3, 4 and 5 respectively), the inner layer 34 is integrally bonded to the inner surface of the thick outer layer 32. In the present invention, the inner layer 34 is a chemically dissimilar, permeation resistant, chemical resistant, fuel resistant thermoplastic material which is melt processible in normal ranges of extrusion, i.e. about 175° C. to about 250° C. Integral bonding between the thick outer layer 32 and the chemically dissimilar inner layer 34 is achieved by an interposed bonding layer 36. By the term "chemically dissimilar" it is meant that the inner layer 34 consists essentially of a non-polyamide material which is capable of adhesion to a bonding layer 36 interposed between the thick outer layer 32 and the inner layer 34 in a manner which will be described subsequently.

The chemically dissimilar thermoplastic material employed in the inner layer 34 is preferably selected from the group consisting of melt-processible polyesters, fluoroplastics, ethylene vinyl alcohol copolymers and mixtures thereof. Suitable melt processible polyesters are selected from the group consisting of polyethylene terepthalate, polybutylene terepthalate and mixtures thereof. Suitable melt-processible fluoroplastic materials are selected from the group consisting of a polyvinylidine fluoride, polyvinyl fluoride, polychlorotrifluoroethylene, ethylene tetrafluoroethylene copolymers, graft copolymers of the preceding materials together with a fluoride-containing polymer such as copolymers of vinylidine fluoride and chlorotrifluoroethane, and mixtures thereof. Other materials suitable for use in the inner layer 34 include materials detailed in U.S. Pat. No. 5,524,673; the specification of which is incorporated herein by reference. The inner layer 35 may exhibit conductive characteristics in that it is capable of dissipation of electrostatic charge within a predetermined range. The material which composes the outer jacket 38 may be inherently conductive in these ranges or, preferably, include in its composition a conductive media in sufficient quantity to permit electrostatic dissipation in the predetermined range. The conductive media may be any suitable material of a composition and shape capable of effecting this static dissipation. The conductive material may be selected from the group consisting of elemental carbon, stainless steel, highly conductive metals such as copper, silver, gold, nickel and silicon, and mixtures thereof. The term "elemental carbon" as used herein is employed to describe and include materials commonly referred to as "carbon black." The carbon black can be present in the form of carbon fibers, powders, spheres, and the like.

In any of the disclosed embodiments, the tubing 10 of the present invention may also, optionally, include an outer jacket or fourth layer 38 which surrounds the outer or third layer 32. The jacket 38 may be either co-extruded with the other layers during the extrusion process or may be put on in a subsequent process such as cross-extrusion. The outer jacket 38 may be made of any material chosen for its structural or insulating characteristics and may be of any suitable wall thickness. In the preferred embodiment, the outer jacket 38 may be made of a thermoplastic material selected from the group consisting of zinc-chloride resistant Nylon 6, Nylon 11, Nylon 12, polypropylene, and thermoplastic elastomers. Thermoplastic elastomers which can typically be employed preferably are selected from the group consisting of SANTOPRENE, KRATON, VICHEM, SARUNK and mixtures thereof. If desired, these materials may be modified to include flame retardants, plasticizers, and the like.

Figure 5:
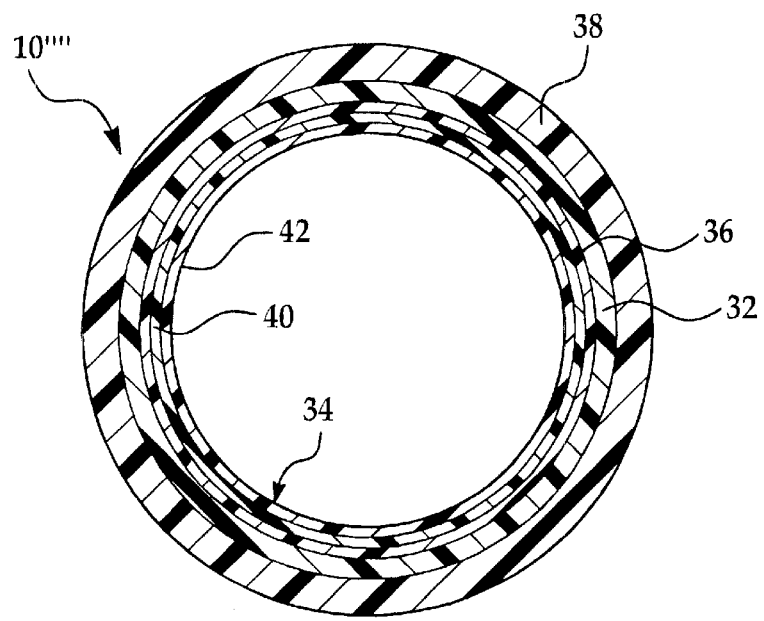
FIG. 5 is a sectional view through a piece of thick-wall, convoluted tubing having five layers of material.
Figure 6:
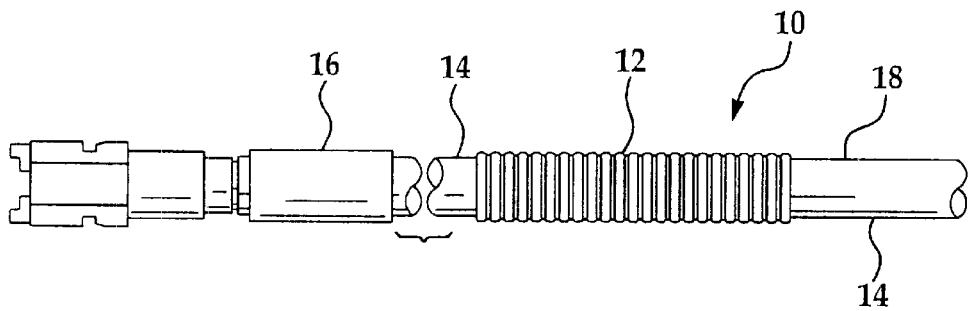
FIG. 6, is a side view, on an enlarged scale, of the thick-walled, convoluted tubing of the present invention with a suitable spin welding connection, an optional wedding band is also shown.
Figure 7:
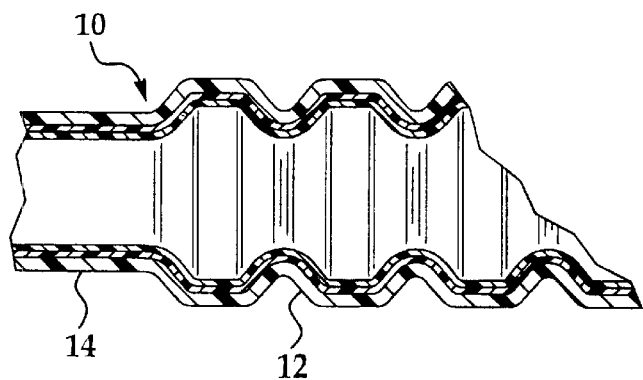
FIG. 7, is a broken, cross-sectional view of a portion of the thick-walled convoluted tubing, on an enlarged scale, of FIG. 6.

The inner layer 34 of the present invention according to the fifth embodiment, as illustrated in FIG. 5, may include an innermost electrostatic dissipation sub-layer 42 which is also capable of serving as a hydrocarbon barrier to assist in the prevention of permeation of aromatic and aliphatic compounds found in gasoline through to the outer layer 32 of the tubing 10 and, thus, out to the surrounding environment.

In the fifth embodiment, the electrostatic dissipation sub-layer 42 of the inner layer 34 may be integrally bonded to the inner surface of an optional sub-layer 40 disposed between sub-layer 42 and the intermediate bonding layer 36. Preferably, the sub-layers 40 and 42 are chemically similar materials in structure and composition. As used here, the term "chemically similar material" is defined as a thermoplastic material selected from the group consisting of polyvinylidine fluoride, polyvinyl fluoride, a graft copolymer of the preceding materials together with a fluorine-containing polymer such a copolymers of vinylidine fluoride and chlorotrifluoroethane, a copolymer of a vinyl fluoride and chlorotrifluoroethylene, the vinyl fluoride material selected from the group consisting of polyvinylidine fluoride, polyvinyl fluoride, and mixtures thereof; a copolymer of vinyl fluoride material and ethylene tetrafluoroethylene; and a nonfluorinated elastomer, and mixtures thereof. Preferably, the sub-layers 40 and 42 are composed of the same material, with the exception of the electrostatic dissipation sub-layer 42 including additional conductive material as described hereinafter. The sub-layers 40 and 42, intermediate bonding layer 36, outer layer 32 and jacket 38 define a five layer tubing 10. In the third, fourth and fifth embodiments, the inner layer 34 is composed of a thermoplastic material chemically dissimilar to the thermoplastic material employed in the outer layer 32 which is melt-processible in the normal ranges of extrusion, i.e. about 175° C. to about 250° C. The thermoplastic material employed in the inner layer 34 is capable of sufficiently permanent laminar adhesion to the intermediate bonding layer 36.

The material according to the fifth embodiment, also contains conductive media in quantities sufficient to permit electrostatic dissipation in a desired range. In the fifth embodiment, the electrostatic dissipation sub-layer 42 of the inner layer 34 exhibits electrostatic conductive characteristics capable of dissipating electrostatic charges in the desired range. Further details of the electrostatic dissipation sub-layer 42 are detailed in U.S. Pat. No. 5,524,673, the specification of which is incorporated by reference herein.

In the third, fourth and fifth embodiments, the inner layer 34 is maintained at a thickness suitable to achieve a hydrocarbon permeation value for the tubing 10 of the present invention no greater than about 0.5 g/m$^2$ in a 24 hour interval. To accomplish this, the characteristics of the inner layer 34 can be relied upon solely or in concert with the intermediate bonding layer 36. It is anticipated that the thickness of the inner layer 34 and the intermediate layer 36 can be modified to accomplish this end. Other materials with their characteristics and advantages that are envisioned for use in thick walled convoluted tube of the present invention are detailed in the patents incorporated herein by reference.

Thus, the present invention provides a mono or multi-layer tubing having at least one convoluted region suitable for integral fluid tight connection in that at least one fluid conveying connector. The tubing can accommodate the introduction of various bends and contours during installation. The material is fuel resistant to fuel permeation and can permit dissipation of electrostatic charge.

The thick wall convoluted tubing of the present invention in the multi-layer configuration generally have an outer wall thickness between about 1.0 and 2.0 mm with thicknesses between about 1.2 and about 1.8 mm is preferred to provide a total wall thickness of about 2.0 mm.

It has been found, quite unexpectedly, that a more robust sealing interface has been achieved between internally inserted connectors and the tube end form when the thicker walled tubing of the present invention is employed. Without being bound to any theory, it is believed that this is due, in part, to increased hoop strength present in the thick-walled convolute tubing over conventional counterparts.

The integration of thick walled convolute tubing of the present invention and connector devices which are internally received in and sealingly matable with the tubing end form provides a durable fluid tight assembly which can be suitably used in higher pressure fuel deliver applications in an automotive vehicle.

Additionally, thick walled convolute tubing of the present invention can be readily processed to impart flame resistance and/or abrasion protection by suitable methods such as cross-head extrusion. It is also possible to integrate regrind material in various applications without compromising performance standards.

Figure 9:
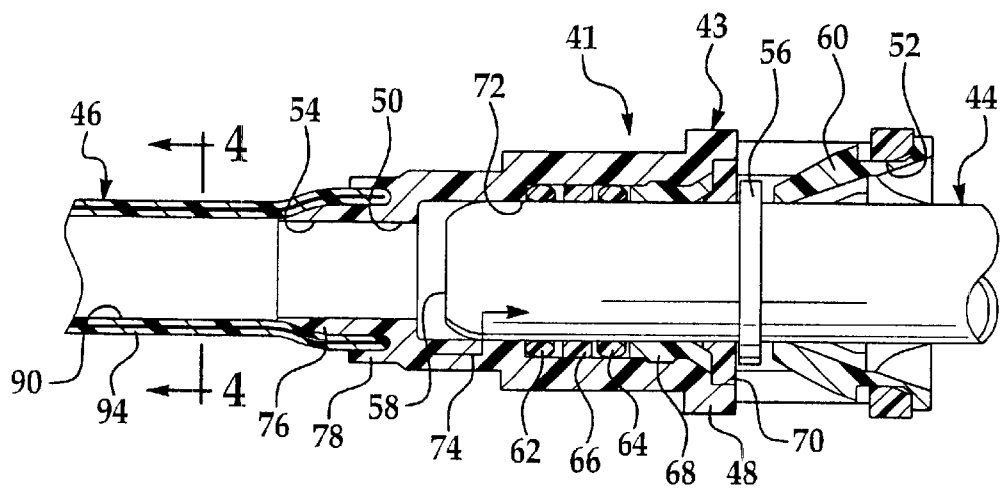
FIG. 9, corresponds with FIG. 9, showing the tube end form spin welded into the connector body.
Figure 10:
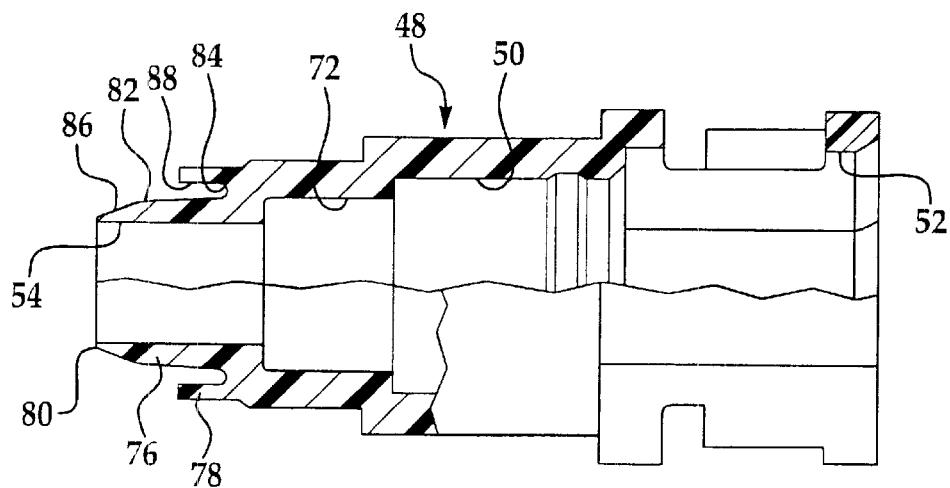
FIG. 10, is a broken cross-sectional detail, on a greatly enlarged scale, of the connector of FIG. 9.

Referring now to FIGS. 9 and 10, there is shown an assembly which includes the thick-walled tubing 46 of the present invention and a suitable connector 41. The connector 41 consists of a body 48 as shown particularly in FIG. 9. Body 48 is formed of glass filled nylon or other suitable material in a generally tubular form having a stepped bore 50 therethrough, extending from a first opening 52 to a second opening 54.

Steel tubing member 44 extends through first opening 52 into bore 50. An upset bead 56, axially off set from a leading end 58 of steel tube 44 releasable engages a retainer 60 which is in assembly with body 48. The outer peripheral surface of steel tube 44 is sealingly engaged with body 48 within bore 50 by first and second resilient O-rings 62 and 64 separated by a spacer 66 and held in their illustrated position by a second spacer 68 and a top hat 70. As illustrated, the leading end 58 of steel tube 44 can be inserted within bore 50 and mechanically engage connector 43 without the use of tools or specialized assembly equipment. Steel tube 44 can be released from connector 41 by resiliently displacing retainer 60.

Connector body 48 is formed of plastic material with a sufficient carbon content or other suitable material to ensure a degree of electrical conductivity sufficient to permit the discharge of static charges generated by the flow of fluid through the system. An intermediate step portion 72 of bore 50 is dimensioned to ensure a slip fit with leading end 58 of steel tube 44 to establish intimate contact and a path of electrical conductivity therebetween as illustrated by arrow 74 (FIG. 9).

As best illustrated in FIG. 10, radially spaced concentric inner and outer flanges 76 and 78, respectively, are integrally formed with and extend axially leftwardly from the main portion of connector body 48. Inner flange 76 extends further than outer flange 78 and terminates at a leading nose 80. Flanges 78 and 80 are circular and concentric with second opening 54.

The radially outermost circumferential surface of inner flange 76 has a first converging tapered portion 82 extending leftwardly from a root or base portion 84, transitioning into a more abrupt, second tapered portion 86, terminating in leading nose 80. First tapered portion 82 of the outer surface of inner flange 76 is deemed a first welding surface. The radially inwardmost surface of outer flange 78 is outwardly tapered, extending from right to left in FIG. 10, defining a second welding surface 88. Thus, welding surfaces 82 and 88 are converging from left to right as viewed in FIG. 10.

Figure 11:
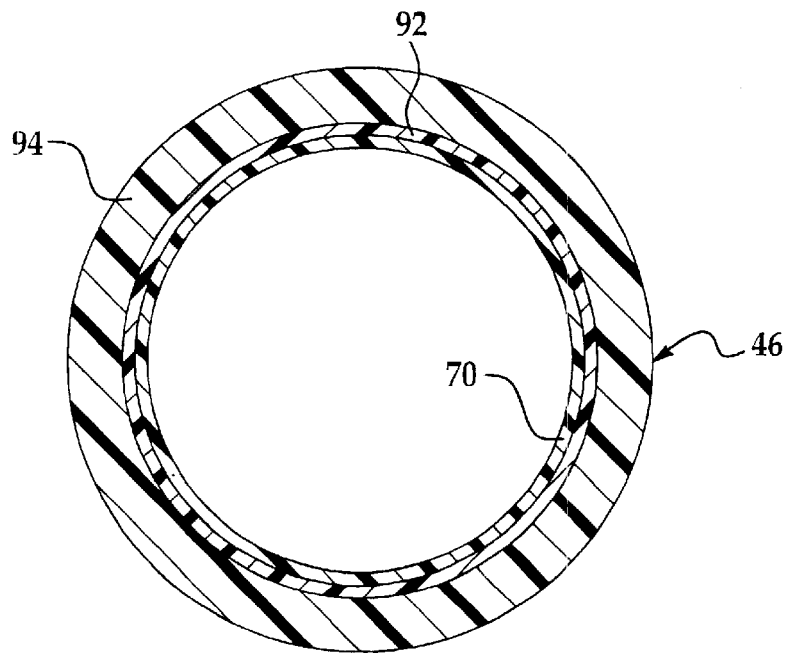
FIG. 11, is a cross-sectional view taken on a greatly enlarged scale of an alternative embodiment of the invention corresponding with FIG. 10.

Referring to FIG. 11, plastic tube end form 46 is illustrated in cross-section and constitutes a multi-layer structure containing an inner or first layer 90 at least one bonding or second layer 92 and an outer or third layer 94. The tube 46 of the present invention is, preferably, fabricated by co-extruding various compositions of thermoplastic materials in a conventional co-extrusion process. The tubing 46 of the present invention is a material which is suitable for use in motor vehicles and comprises a relatively thick outer layer 94 which is non-reactive with the external environment and can withstand various shocks, vibrational fatigue, and changes in temperature as well as exposure to various corrosive and degrading compounds to which it would be exposed through the normal course of operation in the motor vehicle. Suitable materials for use in the present invention may be various melt-processable extrudable thermoplastic material which is resistant to ultra-violet degradation, extreme changes in heat and exposure to gasoline and its additives. The material of choice may also exhibit resistance to environmental hazards, such as exposure to zinc chloride, and resistance to degradation upon contact with materials such as engine oil and brake fluid. Inner and outer layers 90 and 94, respectively, are formed of suitable material such as nylon 12 which is compatible with the material selected for use in forming connector body 48. Furthermore, inner layer 90 of plastic tube 46 may be formulated with graphite or other suitable material rendering it electrically conductive sufficient to dissipate electrostatic charge developed by fluid moving through plastic tube 46.

Figure 8:
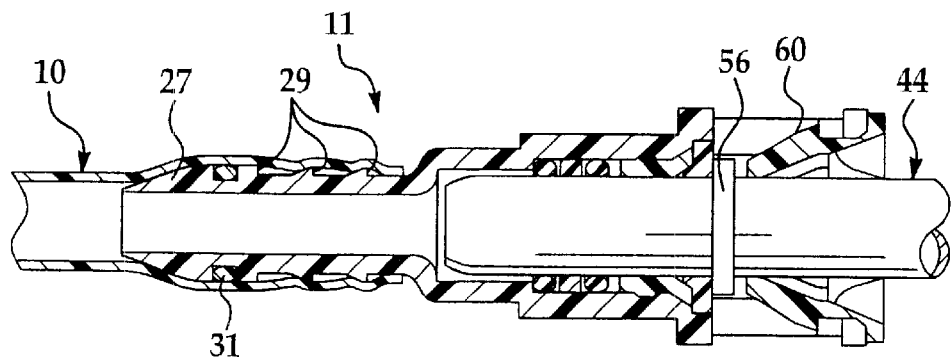
FIG. 8, is a cross-sectional view of a representative connector with conventional tubing in conventional engagement.

A perusal of the differences between the prior art quick connector assembly 11 of FIG. 8 and the preferred embodiment of the present invention in FIG. 9 will illustrate another advantage of the present invention. To ensure adequate pull-apart strength, conventional barbed nipple type connectors as depicted in FIG. 8 required a fairly long stem 27 with multiple barbs 29 and an internally positioned sealing O-ring 31 having axial length of 3–4 times that of the nominal diameter of the mating mono-wall plastic tube 10. In the case of the present invention, weldments created between flanges 76 and 78 are strong enough to reduce their axial length to a dimension of less than the nominal diameter of the mating plastic tube 46. The resulting overall reduction in size provides significant packaging advantages for the end user.

Furthermore, empirical data suggests that only one weldment is necessary to provide adequate pull-apart strength. In fact, tests have shown that it can exceed the nominal tensile strength of the tubing itself. Accordingly, in the broadest sense, only one flange (76 or 78) must be actually welded to its mating tube layer (90 or 94) and the remaining (non-welded) pair must only be in sealing engagement to isolate bonding layer 92. By way of example, only inner weldment zone 106 need be established between inner surface 102 of inner layer 90 and tapered portion (surface) 82 of inner flange 76, while outer surface 100 of outer layer 94 need only be in sealing engagement with adjacent surface 88 of outer flange 78. This permits outer flange to be dimensionally minimalized. As defined herein, "peripheral surface" of the tube includes outer surface 100 and end surface 101 of outer layer 94 and inner surface 102 and end surface 103 of inner layer 90 of tube 46.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A convoluted tubing assembly for use in a fuel supply system for an internal combustion engine of a vehicle, the convoluted tubing assembly comprising:
    a tubing having a first and second region, the first region having an essentially uniform cross-sectional diameter and the second region having a cross-sectional diameter which varies positionally depending on longitudinal location in the second region, the tubing having an inner surface and an opposed outer surface, and an end form;
    a connector comprising a body, a through-passage interconnecting a first opening adapted to receive a mating conduit and a second opening, the second opening defining a first flange concentric with the second opening, the flange having a continuous tapered surface in sealing engagement with the inner surface of the tubing.

2. The convoluted tubing assembly of claim 1, wherein the tubing has a cylindrical wall defining the cross-sectional diameter of the tubing and wherein the thickness of the cylindrical wall is essentially uniform along its longitudinal length, the tubing having a wall thickness between about 0.5 mm and about 2.5 mm.

3. The convoluted tubing assembly of claim 2, wherein the cylindrical wall has a single layer of material.

4. The convoluted tubing assembly of claim 2, wherein the cylindrical wall has multiple layers of material.

5. The convoluted tubing assembly of claim 2, wherein the cylindrical wall has at least one convolution.

6. The convoluted tubing assembly of claim 5, wherein the cross-sectionally diameter of the convolution is between approximately 20% and 300% greater than the cross-sectional diameter of the first region.

7. The convoluted tubing assembly of claim 5, wherein the convolution has at least one of an angled, squared and sinusoidal longitudinal cross-sectional profile.

8. The convoluted tubing assembly of claim 4, wherein an inner layer of the cylindrical wall has conductive characteristics for dissipating electrostatic charge.

9. The convoluted tubing assembly of claim 5, wherein the cylindrical wall has an outer surface and an inner surface, wherein the outer surface is parallel with the inner surface.

10. The convoluted tubing assembly of claim 1, further including connection means for connecting the tubing in a fluid tight manner in the fuel supply system proximate to the internal combustion engine.

11. The convoluted tubing assembly of claim 4, wherein at least one layer of material serves as a hydrocarbon barrier.

12. The convoluted tubing assembly of claim 1 wherein the connector further comprises a second flange, the second flange concentrically disposed radially outward of the inner flange, the second flange having an inwardly oriented surface in sealing engagement with the outer surface of the tubing.

13. The convoluted tubing assembly of claim 12 wherein at least one of the tubing inner surface and tubing outer surface is welded to a respective flange.

14. The convoluted tubing assembly of claim 12 wherein the connector further comprises a base portion interposed between the inwardly oriented surface of the outer flange and the continuous surface of the first flange.

15. The convoluted tubing assembly of claim 14 wherein the first and second flanges have an axial length less than the cross-sectional diameter of the first region of the tubing.

16. A device comprising:

a tube having a cylindrical wall, the tube having an inner surface and an outer surface opposed to the inner surface at least one convolution located in the cylindrical wall and at least one end form; and a connector comprising a body, a through-passage interconnecting a first opening adapted for receiving a mating conduit, and a second opening sealingly attached to the end form of the tube, the second opening defining surfaces contiguously projecting from the connector body, the surfaces sealingly engaging outer and inner peripheral surfaces of the tube.

17. The fuel conveying device of claim 16 wherein the tube is composed of multiple thermoplastic layers.

18. The device of claim 17, wherein at least one layer of thermoplastic material has conductive characteristics for dissipating electrostatic charge.

19. The device of claim 18, wherein at least one thermoplastic layer serves as a hydrocarbon barrier.

20. The device of claim 17, wherein the convolution has at least one of an angled, squared, and sinusoidal longitudinal cross-sectional profile.

21. The device of claim 18, wherein the convolution has one of an angled, squared, and sinusoidal longitudinal cross-sectional profile.

22. The device of claim 17 wherein the surfaces defined at the second opening of the connector include a first flange having an outwardly oriented surface sealingly engaging the inner peripheral surface of the tube and a second flange having an inwardly oriented surface sealingly engaging the outer peripheral surface of the tube.

23. The device of claim 22 wherein the connector further comprises a base portion interposed between the inwardly oriented surface of the second flange and the outward oriented surface of the first flange.

24. The device of claim 23 wherein the end form of the tubing is in abutting communication with the base portion of the connector.

25. The device of claim 22 wherein the tubing has a nominal diameter and wherein the first and second flanges each have an axial length less than the nominal diameter of the tubing.

* * * * *